(12) United States Patent
Shi et al.

(10) Patent No.: US 12,504,455 B2
(45) Date of Patent: Dec. 23, 2025

(54) DEVICE AND METHOD FOR DETECTING ANTENNA MISALIGNMENT IN A NEAR FIELD COMMUNICATION NETWORK

(71) Applicant: Stichting IMEC Nederland, Eidhoven (NL)

(72) Inventors: Chengyao Shi, Eindhoven (NL); Yao-Hong Liu, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 464 days.

(21) Appl. No.: 17/546,722

(22) Filed: Dec. 9, 2021

(65) Prior Publication Data

US 2022/0178982 A1    Jun. 9, 2022

(30) Foreign Application Priority Data

Dec. 9, 2020  (EP) .................................... 20212685

(51) Int. Cl.
*G01R 29/08* (2006.01)
*H01Q 1/24* (2006.01)
(Continued)

(52) U.S. Cl.
CPC ..... *G01R 29/0878* (2013.01); *G01R 29/0892* (2013.01); *H01Q 1/24* (2013.01); *H01Q 1/273* (2013.01); *H04B 5/20* (2024.01)

(58) Field of Classification Search
CPC .. G01R 29/0878; G01R 29/0892; H01Q 1/24; H01Q 1/273; H04B 5/72; H04B 5/77;
(Continued)

(56) References Cited

U.S. PATENT DOCUMENTS 6,424,820 B1    7/2002  Burdick et al.
7,072,718 B2 *  7/2006  Von Arx ............ A61N 1/37229
                                              607/32
(Continued)

FOREIGN PATENT DOCUMENTS

WO    2006096685 A1    9/2006
WO    2018109019 A2    6/2018
(Continued)

OTHER PUBLICATIONS

European Search Report and Written Opinion, EP Application No. 21165008.0, mailed Oct. 6, 2021, 5 pages.
(Continued)

*Primary Examiner* — Eugene Yun
(74) *Attorney, Agent, or Firm* — McDonnell Boehnen Hulbert & Berghoff LLP (57) ABSTRACT

An implantable device for detecting an antenna misalignment with respect to a transmitting implantable device in a near field communication system comprises an antenna unit configured to receive signals through a body channel from the transmitting implantable device. The antenna unit comprises at least two pairs of electrodes configured to cover a blind angle of a radiation pattern of the transmitting implantable device. The implantable device further comprises a processing unit electrically coupled to the antenna unit and configured to detect the antenna misalignment of the at least two pairs of electrodes with respect to the transmitting implantable device.

18 Claims, 5 Drawing Sheets

(51) Int. Cl.
*H01Q 1/27* (2006.01)
*H04B 5/20* (2024.01)

(58) Field of Classification Search
CPC .............. H04B 13/005; A61N 1/37288; A61N 1/37229; A61B 5/0031
USPC ...................................................... 455/41.1
See application file for complete search history.

(56) References Cited

U.S. PATENT DOCUMENTS

| | | | |
|---|---|---|---|
| 7,470,240 B2* | 12/2008 | Schultheiss | A61H 23/0245 601/4 |
| 2006/0194615 A1* | 8/2006 | Vallapureddy | A61N 1/37223 455/562.1 |
| 2012/0095531 A1* | 4/2012 | Derbas | A61N 1/37229 343/866 |
| 2020/0001082 A1* | 1/2020 | Golan | A61N 1/3611 |
| 2021/0093867 A1* | 4/2021 | Donega | A61B 5/389 |

FOREIGN PATENT DOCUMENTS

| WO | 2019238474 A1 | 12/2019 |
|---|---|---|
| WO | 2021048303 A1 | 3/2021 |

OTHER PUBLICATIONS

Bocan, Kara N., and Ervin Sejdic. "Adaptive transcutaneous power transfer to implantable devices: A state of the art review." Sensors 16, No. 3 (2016): 393.

* cited by examiner

DEVICE AND METHOD FOR DETECTING ANTENNA MISALIGNMENT IN A NEAR FIELD COMMUNICATION NETWORK

CROSS-REFERENCE TO RELATED APPLICATIONS

The present application is a non-provisional patent application claiming priority to European Patent Application No. 20212685.0, filed Dec. 9, 2020, the contents of which are hereby incorporated by reference.

FIELD OF THE DISCLOSURE

Embodiments of the present specification relate generally to a near field communication network, and more particularly, to a device, system, and method for detecting antenna misalignment in a body channel communication network.

BACKGROUND

Implantable medical devices are widely used in a health care system to monitor the health condition of a subject. With the use of such devices, delays in treating the subject and the healing time may be substantially reduced.

In general, the implantable devices are used to sense physiological signals from the living being. Further, these signals are amplified and transmitted to another implantable device or external monitoring equipment for further processing or applications. To generate signal that is strong enough and that is capable of being detected by the other implantable device or the external equipment, transmitting and/or receiving circuits require milliwatts of power and relatively long antennas. Usage of such long antennas may increase the size of the devices, which, in turn, makes them impractical for many applications. Also, the size of the devices must be as small as possible to reduce discomfort in the living being and ensure the continuation of daily life. Thus, the size of the antennas is one of the main characteristics that needs to be considered during the design of the implantable devices.

On the other hand, the orientation of these antennas in such a small implantable device plays an important role to improve the strength of the communication between the devices. As the miniaturization trend of the devices continue, the correct alignment of the antennas in such small devices may not be guaranteed during the medical installation procedure. For example, in the intracardiac application, the positioning of the implantable devices is dictated by the geometrical structure of the human body. Also, the antennas may not be aligned accurately due to the difficulty of placing the devices using, a catheter-based delivery system. Further, the position of these implantable devices may change periodically due to the natural heartbeats of the body. Consequently, the perfect alignment of antennas in these devices is not always possible thereby, the communication may be interrupted or lost between the devices.

SUMMARY

In accordance with aspects of the present specification, an implantable device for detecting an antenna misalignment with respect to a transmitting implantable device in a near field communication system is presented.

In a first aspect, an implantable device for detecting an antenna misalignment with respect to a transmitting implantable device in a near field communication system comprises an antenna unit configured to receive signals through a body channel from the transmitting implantable device. The antenna unit comprises at least two pairs of electrodes configured to cover a blind angle of a radiation pattern of the transmitting implantable device. The implantable device further comprises a processing unit electrically coupled to the antenna unit and configured to detect the antenna misalignment of the at least two pairs of electrodes with respect to the transmitting implantable device.

In a first aspect, a method for detecting an antenna misalignment with respect to a transmitting implantable device in a near field communication system comprises positioning at least two pairs of electrodes to receive signals through a body channel from the transmitting implantable device. The at least two pairs of electrodes are positioned in a way to cover a blind angle of a radiation pattern of the transmitting implantable device. The method further comprises measuring, by a processing unit, at least one parameter of the received signals, determining a difference between the measured parameter and a reference value, determining whether the difference is above a threshold value, and detecting, by the processing unit, the antenna misalignment of the at least two pairs of electrodes with respect to the transmitting implantable device when the difference is above the threshold value.

In a third aspect, a near field communication network comprises an implantable device. The implantable device facilitates detecting an antenna misalignment with respect to a transmitting implantable device in a near field communication system. The implantable device comprises an antenna unit configured to receive signals through a body channel from the transmitting implantable device. The antenna unit comprises at least two pairs of electrodes configured to cover a blind angle of a radiation pattern of the transmitting implantable device. The implantable device further comprises a processing unit electrically coupled to the antenna unit and configured to detect the antenna misalignment of the at least two pairs of electrodes with respect to the transmitting implantable device.

BRIEF DESCRIPTION OF THE FIGURES

These and other features and aspects of the present disclosure will become better understood when the following detailed description is read with reference to the accompanying drawings in which like characters represent like parts throughout the drawings, wherein.

All the figures are schematic, not necessarily to scale, and generally only show parts that are necessary to elucidate example embodiments, wherein other parts may be omitted or merely suggested.

DETAILED DESCRIPTION

As will be described in detail hereinafter, various embodiments of systems and methods for detecting an antenna misalignment are presented. That which is encompassed by the claims may, however, be embodied in many different forms and should not be construed as limited to the embodiments set forth herein; rather, these embodiments are provided by way of example. In a particular aspect, two or more pairs of antennas in a receiving implantable device are positioned to cover a blind angle of a radiation pattern of a transmitting implantable device. Further, one or more parameters of signals received from each of these antennas in the receiving implantable device are analyzed to detect the antenna misalignment. Also, the antennas misalignment is corrected without interrupting communication between the devices.

In the following specification and the claims, reference will be made to a number of terms, which shall be defined to have the following meanings. The singular forms "a", "an", and "the" include plural references unless the context clearly dictates otherwise. Furthermore, like numbers refer to the same or similar elements or components throughout.

Figure 1:
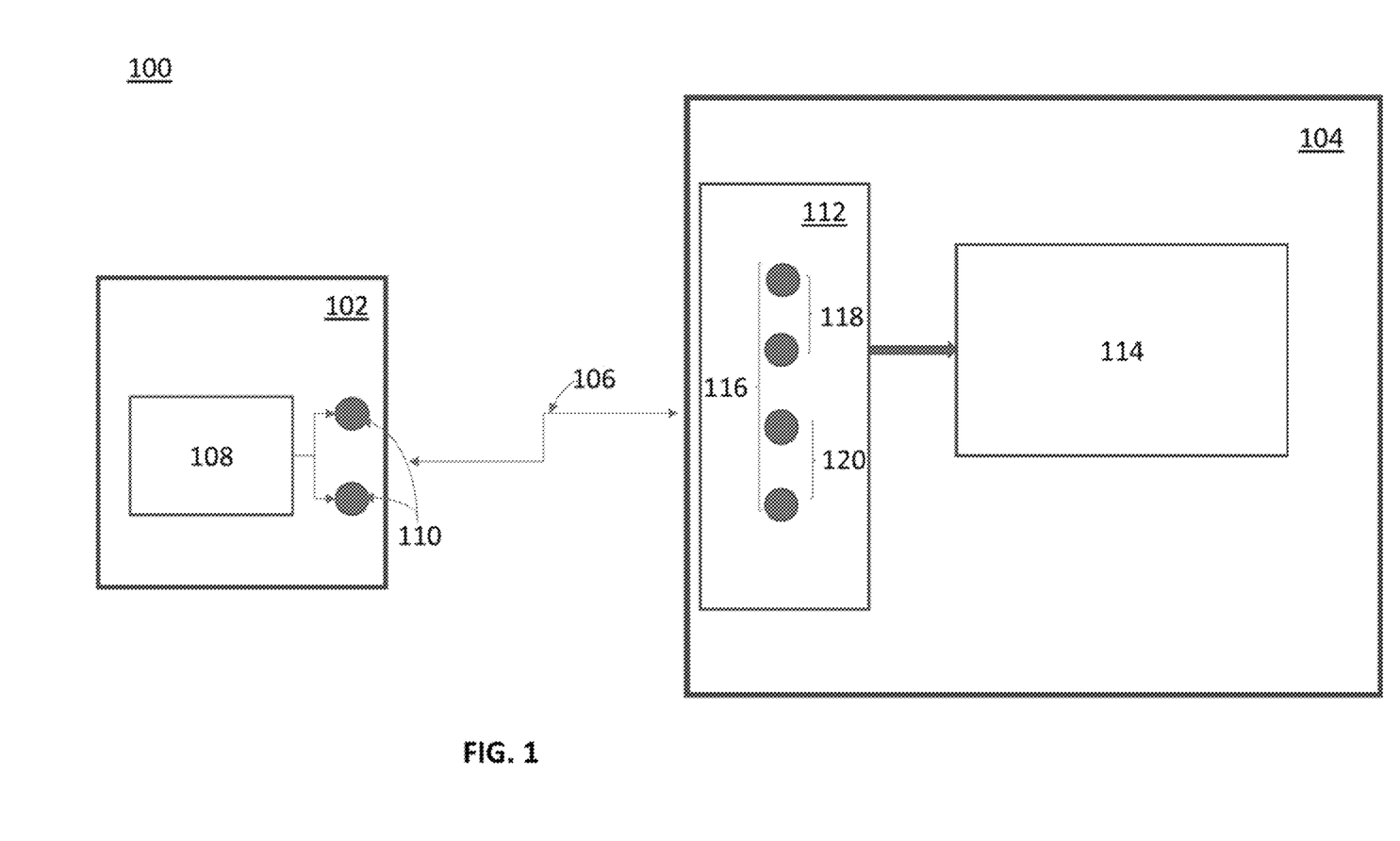
FIG. 1 is a block diagram of a system for detecting antenna misalignment, in accordance with example embodiments.

Turning now to the drawings and referring to FIG. 1, a block diagram of a system 100 for detecting antenna misalignment, in accordance with aspects of the present specification, is depicted. The system 100 may be implemented in a body channel communication (BCC) network or any other similar network that is suitable for near field communication. In one example, data or signals in such networks are exchanged at a certain frequency range going from MHz to GHz. The BCC network may utilize a living body as the communication medium and can utilize both wireline and wireless communication in the body area. As compared to other communication methods, BCC is more stable and has less power attenuation. Also, BCC is almost insensitive to the motion of the living body. It may be noted that the system 100 may be referred to as a near field communication network or a BCC network in the specification.

Further, the system 100 may include one or more implantable devices that are used for monitoring physical conditions of a subject. One of the most used implantable medical devices is a pacemaker that is placed in contact with heart muscle of the subject to detect abnormal movement and deliver electrical pulses to the heart to restore normal movement. Another example of the implantable medical device is neural stimulators that are used to treat back pain and related ailments by delivering electrical pulses. It may be noted that the system may also include other types of implantable devices such as sensors to collect information about the structure and/or functioning of a subject's organs. Also, in some instances, these implantable medical devices may be used to pre-diagnose altered physical conditions of the subject, which, in turn, helps to begin the medical treatment at an early stage. In embodiments of the present description, at least one implantable device may be configured to be implanted inside the body. In some embodiments, one implantable device is placed outside the body, for example, on the skin of the subject.

For ease of understanding, the system 100 is shown with two implantable devices such as a transmitting implantable device 102 and a receiving implantable device 104. It may be noted that the system 100 may include any number of implantable devices and is not limited to two implantable devices 102, 104 as depicted in FIG. 1. Further, near field communications may be established between the transmitting and receiving implantable devices 102, 104 to communicate signals with each other.

In one embodiment, these implantable devices 102, 104 may be inserted and positioned within the body of the subject to communicate with each other through body channels 106 of the subject. The body channels 106 may be defined as a communication medium within the human body. In one example, the body channels 106 may include body skin, tissues, and/or bones. In various embodiments, the body channels 106 may include an impedance network that lies within the human body between the implantable devices 102, 104. As will be described below, these body channels 106 may be leveraged to exchange data and power between the implantable devices 102, 104.

In another embodiment, one of the implantable devices, e.g., the receiving implantable device 104 may be a wearable device that is external to the body of the subject but in contact with the skin if the subject. Further, this wearable device 104 may communicate with the other implantable device, e.g., the transmitting implantable device 102 that is inserted within the body of the subject through the body channels 106, such as the skin and tissue of the subject.

Furthermore, the transmitting implantable device 102 may include a processing unit 108 and a pair of electrodes 110 electrically coupled to the processing unit 108. It may be noted that the transmitting implantable device 102 may include other components and is not limited to the components depicted in FIG. 1. In an embodiment, during operation or functioning of the transmitting implantable device 102, the processing unit 108 is configured to modulate and amplify the signals.

Further, the processing unit 108 transmits these signals through the pair of electrodes 110. In particular, the pair of electrodes 110 is used as an antenna for radiating the signals through the body channels 106 of the living being. It may be noted that the terms "electrode" and "antenna" are used interchangeably in the specification. In one example, the pair of electrodes 110 may be a dipole antenna having a predefined radiation pattern. Typically, the dipole antenna 110 may have maximum radiation or sensitivity in a direction that is at right angles to the axis of the antenna while the radiation falls to zero in a direction that is along the axis of the antenna. It may be noted that the pair of electrodes 110 acting as the dipole antenna may have a blind angle/cone in the radiation pattern. The blind angle/cone in the radiation pattern may be referred to as the volume of space that cannot be scanned or received by the receiving antenna because of limitations of the radiation pattern. This volume of space is usually approximately conical with its vertex at the transmitting, antenna or electrodes. According to an example embodiment, the diameter of the electrodes can be, but is not limited to, between 500 μm to 6 mm.

As depicted in FIG. 1, the radiated signals are then communicated to the receiving implantable device 104 through the body channels 106 of the subject. On the other hand, the receiving implantable device 104 is configured to receive these signals from the transmitting implantable device 102. In particular, the receiving implantable device 104 includes an antenna unit 112 and a processing unit 114. It may be noted that the receiving implantable device 104 may include other components such as a tuning circuit or a resonant circuit and is not limited to the components depicted in FIG. 1. The antenna unit 112 includes two or more pairs of electrodes 116 that are configured to receive the signals from the transmitting implantable device 102. For ease of understanding, the antenna unit 112 is shown with two pairs of electrodes 116 in FIG. 1.

In a conventional system, the correct positioning of the implantable devices is not always possible. The difficulty arises from the necessity to minimize the invasiveness of the surgery in order not to prolong the subject's recovery. Further, due to the natural movement of the body and/or the physiological activity of the body, the devices could slightly change position during the operation time. This can cause a connection problem or a non-stable communication between the devices. Furthermore, in the conventional system, only one antenna is positioned in the receiving implantable device to receive the signals. Initially, this receiving antenna is aligned with the orientation of the transmitting antenna in the transmitting implantable device. However, due to the natural movement of the human body, the transmitting antenna and/or the receiving antenna may shift, tilt, or rotate from an initial position. Consequently, the antennas are misaligned from one another. In one example, a rotation of over 90 degrees of the receiving antenna may cause the received signals to have a phase change of 180 degrees. Further, the receiving antenna may be displaced to a space that is in the blind angle/cone of the radiation pattern of the transmitting antenna. As a result, the receiving antenna may receive poor signals or may fail to receive the signals from the transmitting antenna, which, in turn, ceases communication or causes interrupted communication between the devices.

To overcome the above shortcomings/problems, in the system 100 the receiving implantable device 104 is equipped with two pairs of electrodes 116 that are arranged in a predefined pattern. More specifically, the two pairs of electrodes are placed at an angle of 180 degrees from each other with the centre of rotation from the midpoint of one of the electrodes. It may be noted that the receiving implantable device 104 can be equipped with more than two pairs of electrodes. For example, if N pairs of electrodes are used, in the receiving implantable device 104, each of the N pairs of the electrodes is placed at an angle of 360/N degrees from the other of the N pairs of the electrodes, where N is a positive integer.

In one embodiment, the two pairs of electrodes 116 are positioned in such a way that even if one pair of electrodes 118 is displaced to the space that is in the blind angle/cone, the other pair of electrodes 120 is still away from the blind angle/cone and receives the signals from the transmitting implantable device 102. This, in turn, helps to have an uninterrupted communication between the devices 102, 104.

In another embodiment, the two pairs of electrodes 116 are positioned to be substantially orthogonal with each other so that the blind angle cone of the radiation pattern of the transmitting implantable device 102 is mitigated. In yet another embodiment, the axis of one pair of electrodes 118 is at a predefined angle with respect to the axis of the other pair of electrodes 120. The predefined angle may be in a range from about 30 degrees to about 90 degrees. By placing the electrodes 116 in such a manner may aid the electrodes 116 to receive signals it any of the 360-degree radiation from the transmitting implantable device 102. In an embodiment, at least one of these two pairs of electrodes 116 may have the same plarization as the pair of electrodes 110 at the transmitting implantable device 102 to maximize the power of the received signals. The aspect of positioning the electrodes 116 is described in detail with reference to FIGS. 3 and 4. Further these electrodes 116 in the antenna unit 112 receive the signals from the transmitting implantable device 102 and transmit the received signals to the processing unit 114.

The processing unit 114 is configured to process the received signals to detect the antenna misalignment of the at least two pairs of electrodes 116 in the receiving implantable device 104 with respect to the transmitting implantable device 102. In particular, the processing unit 114 measures the one or more parameters of the received signals. The one or more parameters may include the amplitude, the polarity, etc., of the signals. Further, the processing unit 114 compares the measured parameter with a reference value to determine a difference. For example, the amplitude of the received signals is compared with a reference amplitude value to determine whether the amplitude value is different from the reference amplitude value. Similarly, the phase of the received signals is compared with a reference phase value to determine whether the phase value is different from the reference phase value.

Upon finding the difference between the measured parameter and the reference value, the processing unit 114 determines whether the difference is above a threshold value. For example, the processing unit may verify whether the amplitude difference is above an amplitude threshold value. Similarly, the processing unit may verify whether the phase difference is above a phase threshold value. If the difference is above their respective threshold value, the processing unit 114 confirms the misalignment of the two pairs of electrodes 116 in the receiving implantable device 104 with respect to the pair of electrodes 110 in the transmitting implantable device 102.

After confirming or detecting the misalignment of the two pairs of electrodes 116 in the receiving implantable device 104, the processing unit 114 may correct the difference between the measured parameter and the threshold value, which, in turn, corrects the antenna misalignment. In one example, the amplitude value of the received signal may be adjusted so that the amplitude difference with respect to the amplitude reference value is minimal or negligible. In another example, the phase value of the received signal may be adjusted or shifted so that the phase difference with respect to the phase reference value is minimal or negligible. The aspect of detecting the antenna misalignment and correcting the antenna misalignment is described in detail with reference to FIG. 2.

Thereafter, the processing unit 114 may process the signals or the corrected parameter values for one or more applications. In one example, the processing unit 114 may use these signals or the parameter values for detecting abnormal movement of the heart muscle. In response, the processing unit 114 may deliver or transmit electric pulses to the heart muscle restore normal movement.

Thus, by employing the system 100, the antenna misalignment between the transmitting implantable device 102 and the receiving implantable device 104 is detected. Also, the antenna misalignment is corrected without interrupting the communication between the devices 102, 104 thereby, ensuring a stable connection between the implantable devices 102, 104 irrespective of the alignment of the antennas 110, 116.

Figure 2:
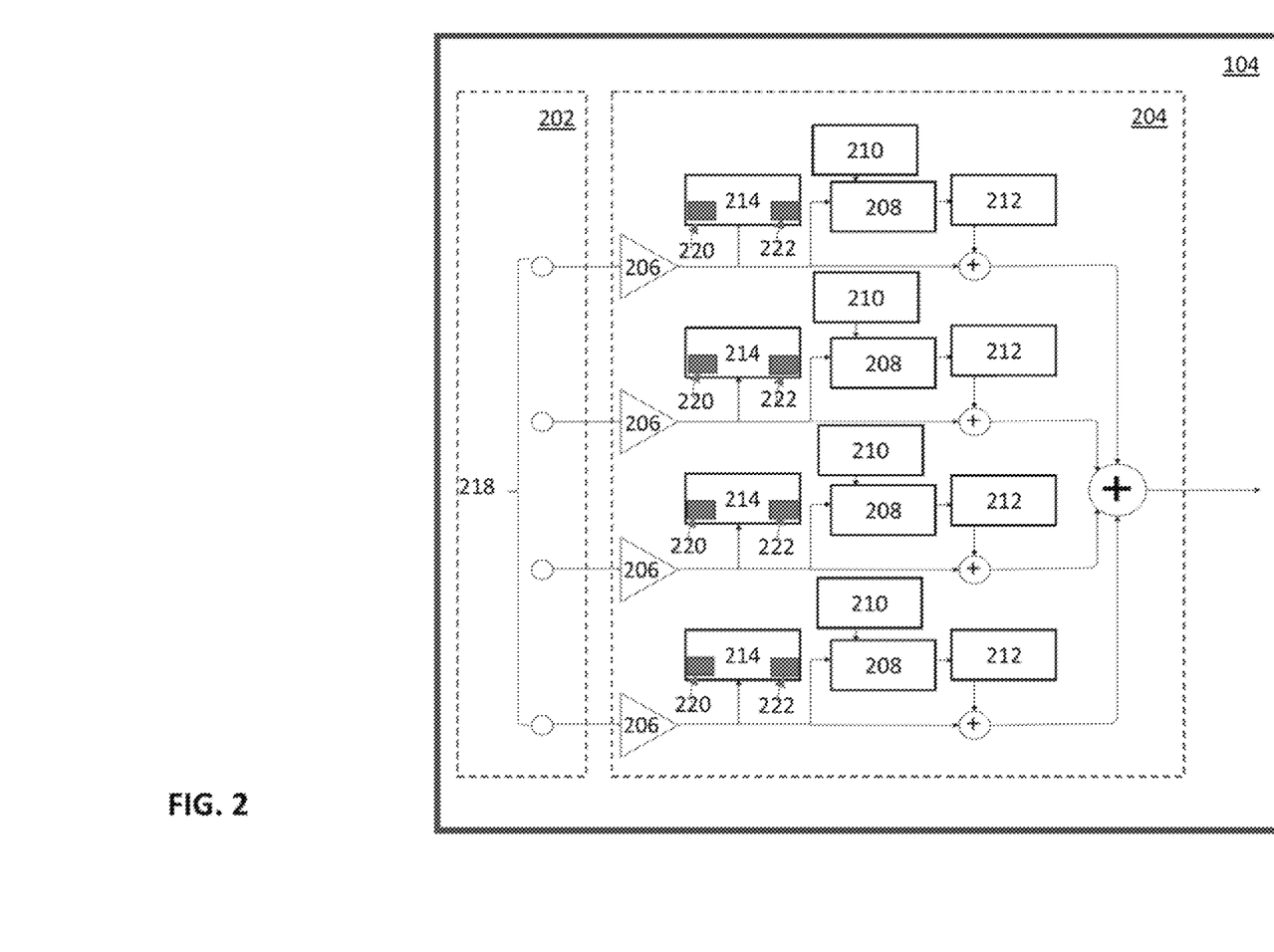
FIG. 2 is a block diagram of a receiving implantable device depicted in FIG. 1, in accordance with example embodiments.

Referring to FIG. 2, a block diagram of a receiving implantable device 104 depicted in FIG. 1, in accordance with aspects of the present specification is presented. The receiving implantable device 104 includes an antenna unit 202 and a processing unit 204. The antenna unit 202 and the processing unit 204 may be similar to the antenna unit 112 and the processing unit 114 depicted in FIG. 1, respectively.

The processing unit 204 may use one or more sub-units or components for detecting and correcting the antenna misalignment. As depicted in FIG. 2, the processing unit 204 includes a plurality of buffering sub-units 206 that is configured to strengthen the received signals by amplifying the magnitude of the signals. The buffering sub-units 206 may be used as an interface between the antenna unit 202 and the processing unit 204. Also, the buffering sub-units 206 are used to sense the differential signals received at each electrode of the antenna unit 202, amplify these differential signals, and perform the impedance adaptation so that these signals are received by the other sub-units in the processing unit 204.

In addition to the buffering sub-units 206, the processing unit 204 includes a plurality correlating sub-units 208, a plurality of training pattern units 210, a plurality of correcting sub-units 212, a plurality of peak and/or phase detectors 214. Each of the electrodes 218 is coupled to a branch of the processing unit 204 that includes a buffering sub-unit 206, a correlating sub-unit 208, a training pattern unit 210, a correcting sub-unit 212, and peak and/or phase detectors 214, as depicted in FIG. 2.

According to an example embodiment, in each branch of the processing unit 204, the correlating sub-unit 208 is electrically coupled to the buffering sub-unit 206 and configured to receive the signals from a corresponding electrode in the antenna unit 202. Further, the correlating sub-unit 208 may measure one or more parameters of the received signals. Also, the correlating sub-unit 208 is electrically coupled to the training pattern unit 210 to receive a predetermined training pattern. In one embodiment, the predetermined training pattern may include parameter values that are representative of the signals received from the transmitting implantable device (see FIG. 1, 102) when there is no antenna misalignment between the transmitting and receiving implantable devices 102, 104. In one example, the predetermined training pattern may be a square wave signal with 50% of duty cycle or series of positive or negative pulses. Thereafter, the correlating sub-unit 208 may correlate or compare the received signals with the predetermined training pattern to determine the difference between the measured parameter and the reference value. In one embodiment, the correlating sub-unit 208 may correlate the received signals with the predetermined training pattern to determine the sign of the signal in the correcting sub-unit 212. Also, the correlation of these signals may aid in determining the direction of the rotation of the electrodes/antennas or the rotation misalignment.

Upon determining the difference between the measured parameter and the reference value, the correlating sub-unit 208 provides the difference value to the correcting sub-unit 212 where the difference between the measured parameter and the reference value is corrected or rectified. In one example, the amplitude value of the received signal may be increased or decreased so that the amplitude difference value is reduced to zero or a minimal/negligible value. In another example, the phase value of the received signal may be increased or decreased so that the phase difference value is reduced to zero or a minimal/negligible value. As a result, the signals are in phase with the training pattern. Finally, the signals from all the branches are summed together. In particular, these signals from the individual branches are added to each other with the same polarity or phase for achieving a better signal-to-noise (SNR) of the signal.

Thus, by correlating and correcting the difference between the measured parameter and the reference value, the antenna misalignment may be mitigated or corrected. It may be noted that in the system, the antenna misalignment is corrected without interrupting the communication between the devices 103, 104. Also, the antenna misalignment is corrected without orienting or changing the position of the electrodes or antennas in the transmitting and receiving implantable devices 102, 104.

In one example embodiment, the peak and/or phase detectors 214 may be used tip detect the antenna misalignment. In particular, as depicted in FIG. 2, the peak and/or phase detectors 214 may comprise a peak detector 220 that is electrically coupled to the antenna unit 202 via the buffering sub-unit 206. Further, the peak detector 220 is configured to measure peak or maximum value as the at least one measured parameter of the received signals. In one example, the peak value may include a peak/maximum voltage or a peak/maximum current of the received signals. Further, the peak detector 220 detects whether the two pairs of electrodes 218 have shifted horizontally from a reference position based on the measured peak value of the received signals. More specifically, if the difference between the measured peak value and the reference value is above the threshold value, the peak detector 220 detects the antenna misalignment as the horizontal shift of the at least two pairs of electrodes from the reference position. In an example embodiment, the threshold value is the mean value between the received signals, or the comparison can be made between the polarity of the signals.

Similar to the peak detector 220, the peak and/or phase detectors 214 may comprise a phase detector 222 that is electrically coupled to the antenna unit 202 via the buffering sub-unit 206. Further, the phase detector 222 is configured to measure a phase value as the at least one measured parameter of the received signals. In one example, the phase value may indicate a phase shift of the received signals. Further, the phase detector 222 detects whether the two pairs of electrodes 218 have a rotational shift from a reference position based on the measured phase value of the received signals. More specifically, if the difference between the measured phase value and the reference value is above the threshold value, the phase detector 222 detects the antenna misalignment as the rotational shift of the at least two pairs of electrodes 218 from the reference position.

In another example embodiment, the processing unit 204 may detect the antennae misalignment without correlating the received signals with the predefined training pattern. More specifically, the processing unit 204 may compute an average value of the measured at least one parameter over a predefined window. The predefined window may be referred to as a time period over which the parameter such as the amplitude value is continuously measured. Thereafter, the average value of these measured amplitude values is computed over the predefined window. It may be noted that the average value may be repeatedly computed for consecutive windows. Upon computing the average value, the processing unit 204 may compare the computed average value with a corresponding reference value to determine whether the difference is above the threshold value. For example, the average value of the amplitude parameter may be compared with the amplitude reference value. Similarly, the phase value oldie phase parameter may be compared with the phase reference value. If the difference is above the threshold value, the processing unit 204 detects the antenna misalignment.

In yet another example embodiment, the processing unit 204 may measure the at least one parameter from the signals received from each of the electrodes 218. For example, the antenna unit 202, as depicted in FIG. 2, includes four electrodes 218. The processing unit receives four signals separately from each of these four electrodes 218. Further, the processing unit 204 measures at least one parameter, e.g., amplitude in each of these four signals. Thereafter, the processing unit 204 may compute an average value of these measured parameters. In this case, the processing unit 204 may compute the average value from the four measured parameters, e.g., four amplitude values that correspond to respective electrodes. Upon computing the average value, the processing unit 204 may compare the computed average value with a corresponding reference value to determine whether the difference is above the threshold value. If the difference is above the threshold value, the processing unit 204 detects or confirms the antenna misalignment. Thus, the receiving implantable device 104 aids in detecting the antenna misalignment without interrupting the communication between the devices.

Figure 3:
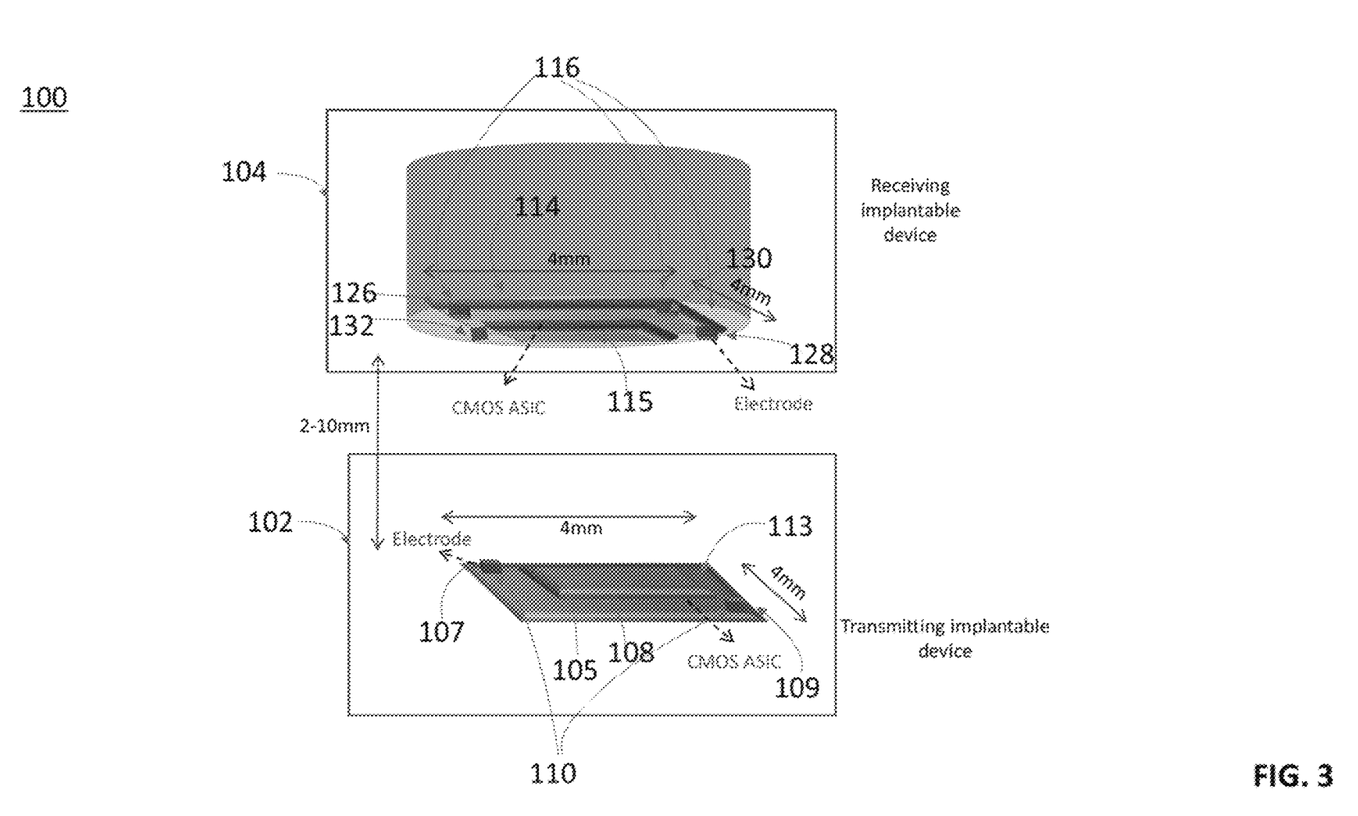
FIG. 3 is a diagrammatical representation of a system depicting positions of electrodes or antennas, in accordance with example embodiments.

Referring to FIG. 3, a diagrammatical representation of a system 100 depicting position of antennas or electrodes, in accordance with aspects of the present specification, is presented. The system 100 includes a transmitting implantable device 102 and a receiving implantable device 104. The transmitting implantable device 102 is representative of the transmitting implantable device depicted in FIG. 1. Similarly, the receiving implantable device 104 is representative of the receiving implantable device depicted in FIG. 1.

The transmitting implantable device 102 includes a processing unit 108 and a pair of electrodes 110. As depicted in FIG. 3, the processing unit 108 includes CMOS ASIC 105 that aids in processing the signals and transmitting the signals to the pair of electrodes 110. In one example, the pair of electrodes 110 may be referred to as dipole antennas. Further, the pair of electrodes 110 may be electrically coupled to the processing unit 108 for receiving the signals and transmitting the received signals to the receiving implantable device 104.

Furthermore, the pair of electrodes 110 includes a first electrode 107 and a second electrode 109 that are positioned on the surface 113 of the processing unit 108. In one embodiment, the surface 113 may have a length of 4 mm and a width of 4 mm. Further, the first electrode 107 and the second electrode 109 are positioned on two diagonal corners of the surface 113 as depicted in FIG. 3. The electrodes 107, 109 are small antennas having a certain area. Also, these electrodes 107, 109 may have a certain thickness. In one embodiment, the electrodes 107, 109 may be positioned on one side of the surface 113 and separated from each other with a distance of less than 6 mm. In some embodiments, the misalignment may be a horizontal shift of the electrode pairs 126, 128 and 132, 130 with respect to the electrode pair 107, 109 in any direction in a plane defined by surface 113.

On the other hand, the receiving implantable device 104 includes two pairs of electrodes 116 and a processing unit 114. The two pairs of electrodes 116 are configured to receive the signals from the transmitting implantable device 102 via the body channel (see FIG. 1, 106) of the subject. Further, these received signals are transmitted to the processing unit 114. As depicted in FIG. 3, the processing unit 114 includes CMOS ASIC 115 that aids in processing the signals received from the two pairs of electrodes 116.

Furthermore, the two pairs of the electrodes 116 include a first electrode 126, a second electrode 128, a third electrode 130, and a fourth electrode 132 that are positioned on four corners of the surface of the processing unit 114. These electrodes are separated from each other with a predefined distance. Also, the distance between the two pairs of the electrodes 116 in the receiving implantable device 104 and the pair of electrodes 110 in the transmitting implantable device 102 is in the range from about 2 mm to about 10 mm. In addition, each of these electrodes 116, 110 may have a certain dimension.

In one example embodiment, the distance between two electrodes of the at least two pairs of electrodes 116 is less than one-tenth (1/10) of the wavelength of the received signals.

Figure 4:
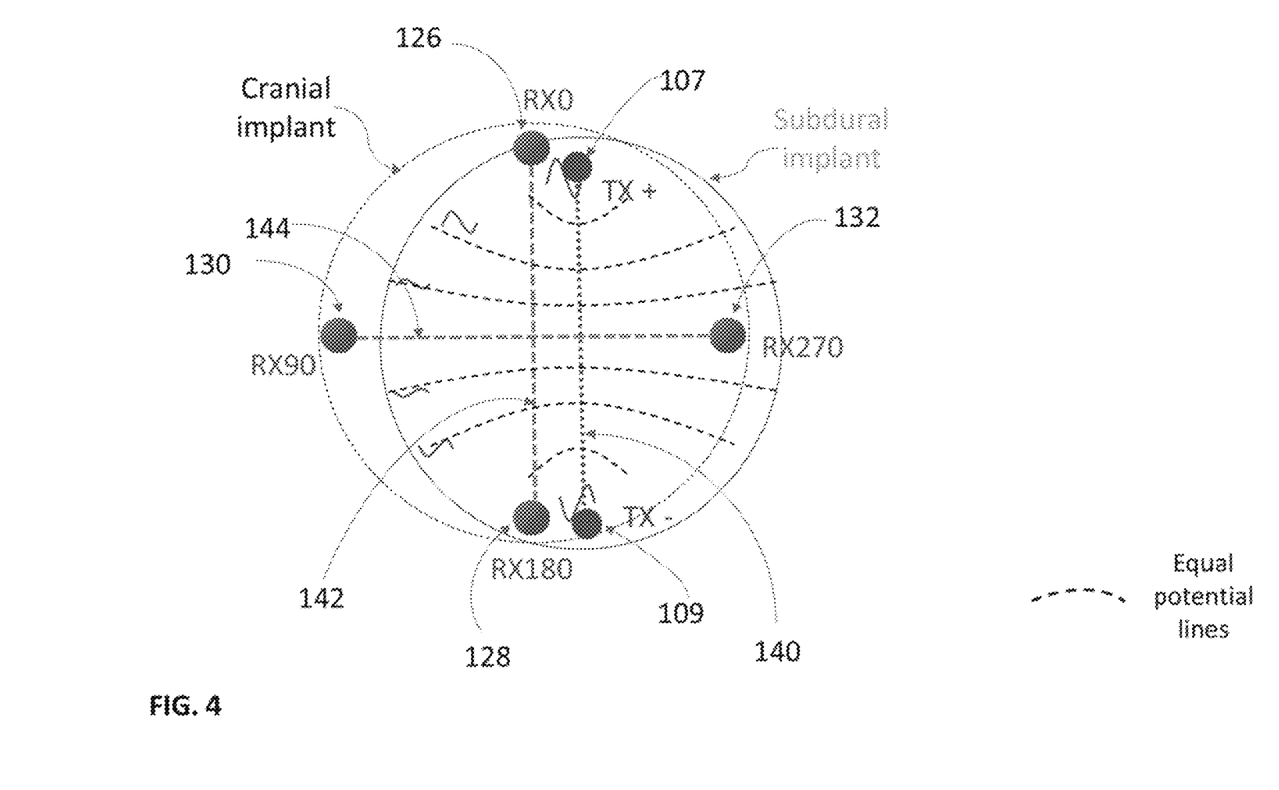
FIG. 4 is a diagrammatical representation of the orientation of electrodes positioned in the transmitting and receiving implantable devices, in accordance with example embodiments.

Referring to FIG. 4, a diagrammatical representation of electrodes 110, 116 positioned in the transmitting and receiving implantable devices 102, 104, in accordance with aspects of the present specification is depicted. The transmitting implantable devices 102 includes two electrodes 107, 109 that are placed on two opposite sides on the surface of the processing unit 108. Also, these two electrodes 107, 109 are on the same line of axis 140 as depicted in FIG. 4. In some embodiments, the misalignment may be a rotational (angular) shift of the electrode pairs 126, 128 and 132, 130 with respect to the electrode pair 107, 109.

Further, the receiving implantable devices 104 include two pairs of electrodes 126, 128, 130, 132 that are placed on four sides on the surface of the processing unit 114. In particular, the first electrode 126 and the second electrode 128 are placed on two opposite sides on the surface of the processing unit 114. Similarly, the third electrode 130 and the fourth electrode 132 are placed on the other two opposite sides on the surface of the processing unit 114, as depicted in FIG. 4. Also, the first electrode 126 and the second electrode 128 are on the first line of axis 142 while the third electrode 130 and the fourth electrode 132 are on the second line of axis 144 that is orthogonal to the first line of axis 142. Thus, the electrode pair 126, 128 and the electrode pair 130, 132 are perpendicular to each other and each electrode pair is at an angle of 90 degrees from the other electrode pair. This, in turn, helps to receive the signals even if the radiation of the signals is within a blind angle/cone of the radiation pattern of the transmitting implantable device 102.

Figure 5:
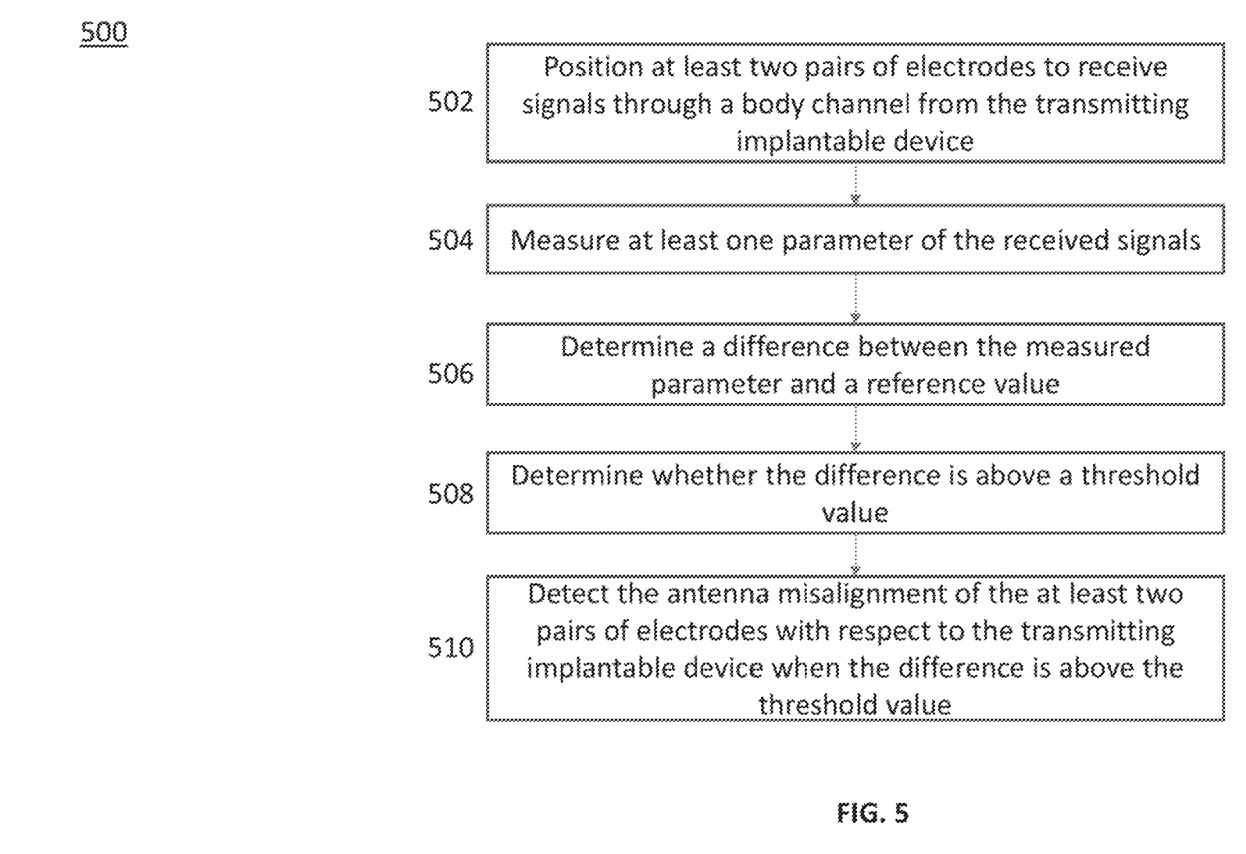
FIG. 5 is a flow chart illustrating a method for detecting antenna misalignment, in accordance with example embodiments.

Referring to FIG. 5, a flow chart illustrating a method 500 for detecting antenna misalignment, in accordance with aspects of the present specification, is presented. For ease of understanding, the method 500 is described with reference to the components of FIGS. 1-5. The method 500 begins with a step 502, where at least two pairs of electrodes 116 are positioned to receive signals through a body channel 106 from the transmitting implantable device 102. The at least two pairs of electrodes 116 are positioned in a way to cover a blind angle of a radiation pattern of the transmitting implantable device 102. In particular, the electrodes 116 are positioned at an angle of 90 degrees from each other so that the electrodes 116 receive signals from any of the 360-degree radiation of the transmitting implantable device 102, particularly the pair of electrodes 110.

Subsequently, at step 504, the processing unit 114 measures at least one parameter of the received signals. The parameter y include the amplitude, the polarity, etc., of the signals. In addition, at step 506, the processing unit 114 determines a difference between the measured parameter and a reference value. In one example, the processing unit 114 may compare the measured amplitude value with a reference amplitude value to determine a difference. Similarly, the phase of the received signals is compared with a reference phase value to determine a difference.

Furthermore, at step 508, the processing unit 114 determines whether the difference is above a threshold value. For example, the processing unit 114 may verify whether the amplitude difference is above an amplitude threshold value. Similarly, the processing unit 114 may verify whether the phase difference is above a phase threshold value.

Further, at step 510, the processing unit 114 detects the antenna misalignment of the at least two pairs of electrodes 116 with respect to the transmitting implantable device 102, when the difference is above the threshold value. In on example, if the amplitude difference is above the amplitude threshold value or the phase difference is above the phase threshold value, the processing unit 114 confirms the misalignment of the at least two pairs of electrodes 116 in the receiving implantable device 104 with respect to the pair of electrodes in the transmitting implantable device 102.

Upon detecting the antenna misalignment, the processing unit 114 may correct the difference by adjusting or shifting the measured parameter values close to the reference value. This, in turn, corrects or rectifies the antenna misalignment without interrupting the ongoing communication between the devices 102, 104.

The various embodiments of the systems and methods presented hereinabove aid in detecting, an antenna misalignment. Also, the antennas misalignment is corrected without interrupting communication between the devices thereby, ensuring a stable connection between the implanted devices irrespective of the alignment of the antennas. Moreover, with the systems and methods, the antenna misalignment is addressed without compromising on the size of the antennas. Hence, the size of the devices may be made as small as possible to provoke less discomfort in the living being and ensure the continuation of daily life.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

While the technology has been described in detail in connection with only a limited number of implementations, it should be readily understood that the claims are not limited to such disclosed implementations. Rather, the technology can be modified to incorporate any number of variations, alterations, substitutions, or equivalent arrangements not heretofore described, but which are commensurate with the spirit and scope of the disclosure. Additionally, while various implementations of the technology have been described, it is to be understood that aspects of the technology may include only some of the described implementations. Accordingly, the claims are not to be seen as limited by the foregoing description but are only limited by the scope of the appended claims.

What is claimed is:

1. An implantable device for detecting an antenna misalignment with respect to a transmitting implantable device in a near field communication system, wherein the transmitting implantable device comprises a radiation pattern with a blind angle, the implantable device comprising:
   an antenna unit configured to receive signals through a body channel from the transmitting implantable device, wherein the antenna unit comprises at least two pairs of electrodes, wherein an axis of one pair of electrodes is at a predefined angle with respect to an axis of another pair of electrodes; and
   a processing unit electrically coupled to the antenna unit, the processing unit being configured to detect and correct the antenna misalignment of the at least two pairs of electrodes with respect to the transmitting implantable device,
   wherein the processing unit comprises a plurality of correlating sub-units,
   wherein each correlating sub-unit is electrically coupled to a corresponding electrode to receive the corresponding signal, and
   wherein each correlating sub-unit is configured to compare the received signal with a predetermined training pattern to determine a difference between a measured parameter and a reference value.

2. The implantable device of claim 1, wherein the processing unit is configured to detect the antenna misalignment by:
   measuring at least one parameter of the received signals;
   determining a difference between the measured parameter and a reference value; and
   determining whether the difference is above a threshold value.

3. The implantable device according to claim 2, wherein the processing unit comprises a plurality of correcting sub-units, wherein each correcting sub-unit is electrically coupled to a corresponding correlating sub-unit and configured to rectify the antenna misalignment by correcting the difference between the measured parameter and the reference value.

4. The implantable device according to claim 2, wherein the processing unit is configured to:
   compute an average value of the measured at least one parameter over a predefined time window; and
   compare the computed average value with a corresponding reference value to determine whether the difference is above the threshold value.

5. The implantable device according to claim 2, wherein the processing unit is configured to:
   measure at least one parameter of each signal received from the at least two pairs of electrodes;
   compute an average value of the measured at least one parameter of the received signals from the at least two pairs of electrodes; and
   compare the computed average value with a corresponding reference value to determine whether the difference is above the threshold value.

6. The implantable device according to claim 5, wherein the processing unit comprises a peak detector configured to measure a peak value as the at least one measured parameter of the received signals.

7. The implantable device according to claim 6, wherein the processing unit is configured to detect the antenna misalignment as a horizontal shift of the at least two pairs of electrodes from a reference position when the difference between the measured peak value and the reference value is above the threshold value.

8. The implantable device according to claim 7, wherein the processing unit comprises a phase detector configured to measure a phase value as the at least one measured parameter of the received signals.

9. The implantable device according to claim 8, wherein the processing unit is configured to detect the antenna misalignment as a rotational shift of the at least two pairs of electrodes from a reference position when the difference between the measured phase value and the reference value is above the threshold value.

10. The implantable device according to claim 9, wherein a distance between two electrodes of the at least two pairs of electrodes is less than one-tenth of a wavelength of the received signals.

11. The implantable device according to claim 10, wherein a distance between two electrodes of the at least two pairs of electrodes is 4 mm.

12. The implantable device according to claim 2, wherein the processing unit comprises a peak detector configured to measure a peak value as the at least one measured parameter of the received signals.

13. The implantable device according to claim 1, wherein the processing unit comprises a phase detector configured to measure a phase value of the received signals to facilitate detection of antenna misalignment.

14. The implantable device according to claim 1, wherein a distance between two electrodes of the at least two pairs of electrodes is less than one-tenth of a wavelength of the received signals.

15. The implantable device according to claim 1, wherein a distance between two electrodes of the at least two pairs of electrodes is 4 mm.

16. A near field communication network comprising an implantable device according to claim 1.

17. A method for detecting an antenna misalignment with respect to a transmitting implantable device in a near field communication system, wherein the transmitting implantable device comprises a radiation pattern with a blind angle, the method comprising:
- positioning at least two pairs of electrodes to receive signals through a body channel from the transmitting implantable device, wherein an axis of one pair of electrodes is at a predefined angle with respect to an axis of another pair of electrodes;
- measuring, by a processing unit, at least one parameter of the received signals;
- determining a difference between the measured parameter and a reference value;
- determining whether the difference is above a threshold value;
- detecting, by the processing unit, the antenna misalignment of the at least two pairs of electrodes with respect to the transmitting implantable device when the difference is above the threshold value; and
- rectifying, by the processing unit, the antenna misalignment,
- wherein the processing unit comprises a plurality of correlating sub-units,
- wherein each correlating sub-unit is electrically coupled to a corresponding electrode to receive the corresponding signal, and
- wherein each correlating sub-unit is configured to compare the received signal with a predetermined training pattern to determine a difference between the measured parameter and the reference value.

18. The method according to claim 17, wherein rectifying, by the processing unit, the antenna misalignment comprises correcting the difference between the measured parameter and the reference value.

* * * * *